Figure 1:
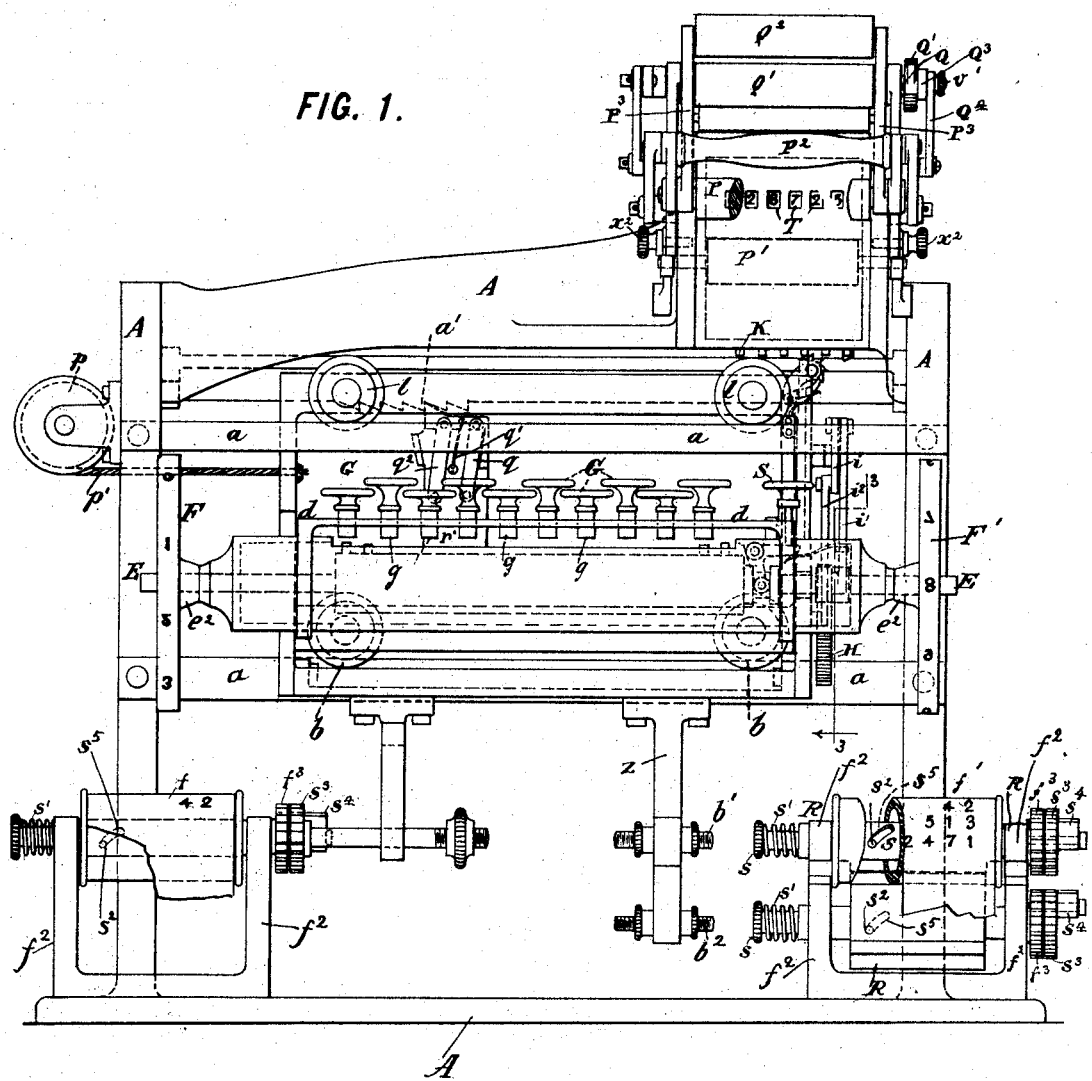

(No Model.) 8 Sheets—Sheet 1.

G. RICHMOND.
CALCULATING AND RECORDING MACHINE.

No. 503,986. Patented Aug. 29, 1893.

WITNESSES:
John Becker
Fred White

INVENTOR:
George Richmond,
By his Attorneys,
Arthur C. Fraser & Co.

(No Model.) 8 Sheets—Sheet 2.

G. RICHMOND.
CALCULATING AND RECORDING MACHINE.

No. 503,986. Patented Aug. 29, 1893.

WITNESSES:
John Becker
Fred White

INVENTOR:
George Richmond,
By his Attorneys,
Arthur G. Fraser & Co.

(No Model.)  8 Sheets—Sheet 3.
G. RICHMOND.
CALCULATING AND RECORDING MACHINE.
No. 503,986.  Patented Aug. 29, 1893.
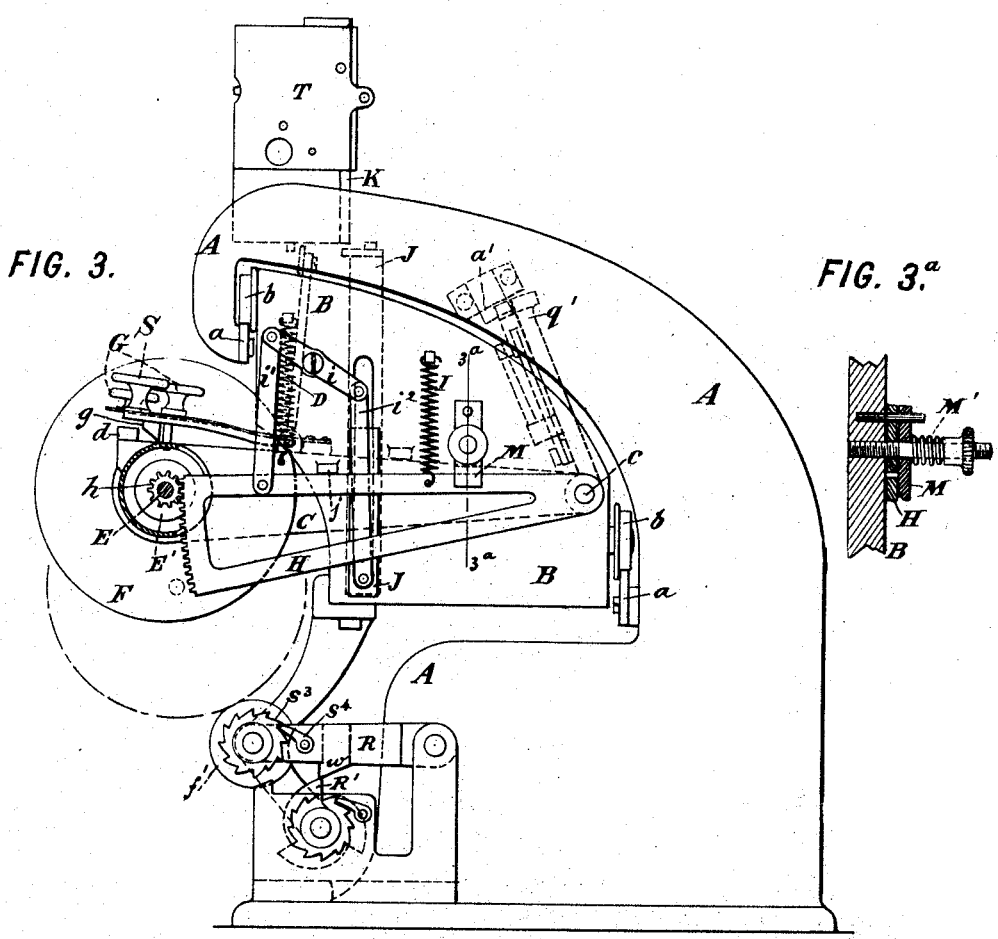
FIG. 3.  FIG. 3.ª
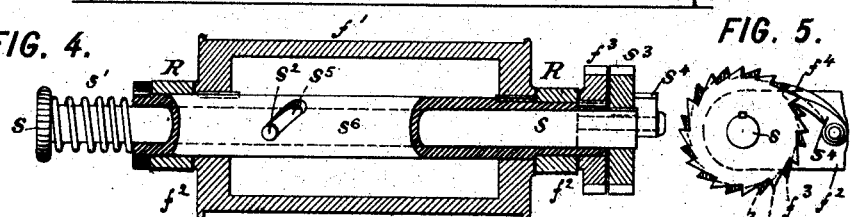
FIG. 4.
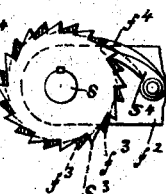
FIG. 5.
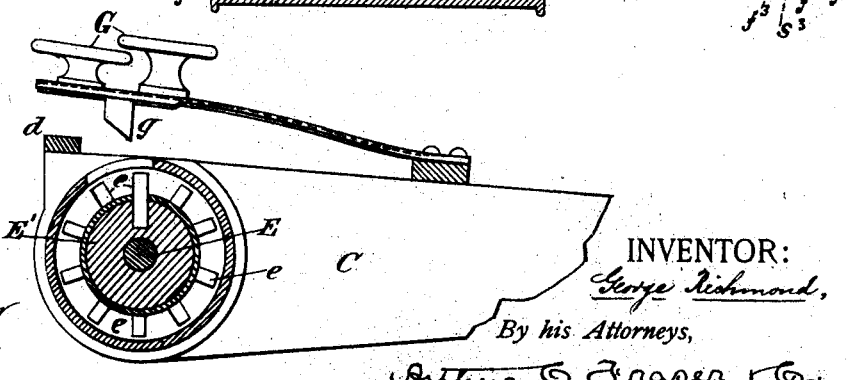
FIG. 6.
WITNESSES:
John Becker
Fred White
INVENTOR:
George Richmond,
By his Attorneys,
Arthur E. Fraser & Co.

(No Model.) 8 Sheets—Sheet 4.
G. RICHMOND.
CALCULATING AND RECORDING MACHINE.

No. 503,986. Patented Aug. 29, 1893.

WITNESSES:
John Becker
Fred White

INVENTOR:
George Richmond,
By his Attorneys,
Arthur C. Fraser & Co.

(No Model.) 8 Sheets—Sheet 5.
G. RICHMOND.
CALCULATING AND RECORDING MACHINE.

No. 503,986. Patented Aug. 29, 1893.

FIG. 14ᵃ.

WITNESSES
John Becker
Fred White

INVENTOR:
George Richmond.
By his Attorneys
Arthur C. Fraser & Co.

(No Model.) 8 Sheets—Sheet 6.
G. RICHMOND.
CALCULATING AND RECORDING MACHINE.

No. 503,986. Patented Aug. 29, 1893.

WITNESSES:
John Becker
Fred White

INVENTOR:
George Richmond,
By his Attorneys,
Arthur C. Fraser & Co.

(No Model.) 8 Sheets—Sheet 7.
G. RICHMOND.
CALCULATING AND RECORDING MACHINE.
No. 503,986. Patented Aug. 29, 1893.
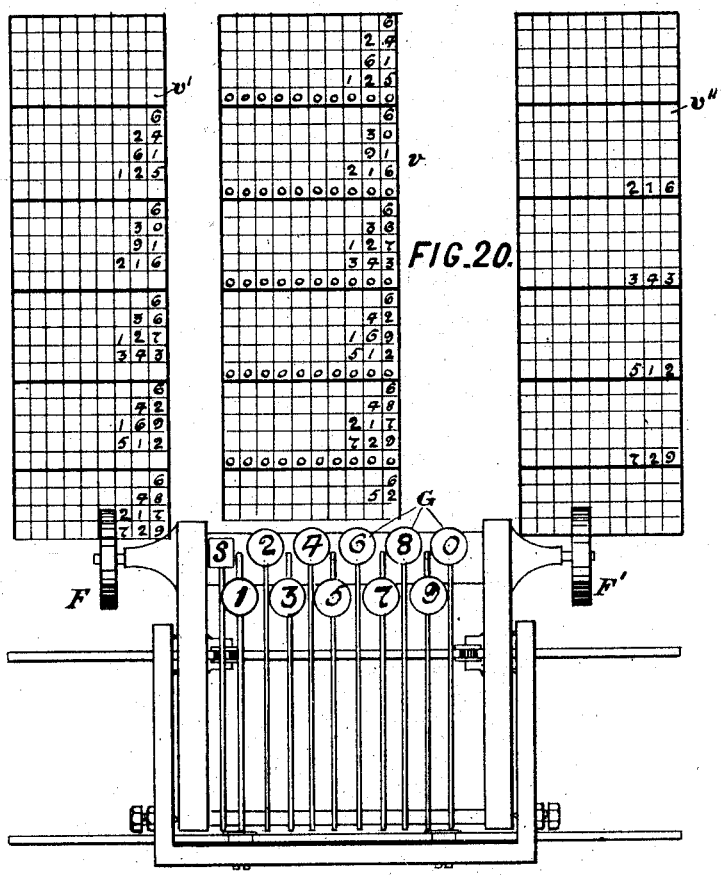
FIG. 20.
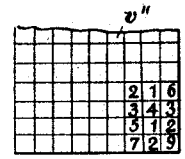
FIG. 20ª.
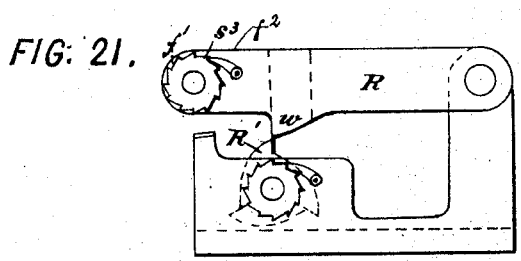
FIG. 21.
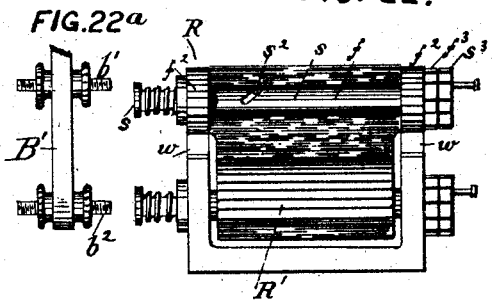
FIG. 22ª. FIG. 22.
WITNESS:
John Becker
Fred White
INVENTOR
George Richmond,
BY
Arthur G. Fraser & Co.
ATTORNEYS.

(No Model.)  8 Sheets—Sheet 8.

G. RICHMOND.
CALCULATING AND RECORDING MACHINE.

No. 503,986. Patented Aug. 29, 1893.

WITNESSES:
John Becker
Fred White

INVENTOR:
George Richmond,
By his Attorneys,
Arthur C. Fraser & Co.

UNITED STATES PATENT OFFICE.

GEORGE RICHMOND, OF NEW YORK, N. Y.

CALCULATING AND RECORDING MACHINE.

SPECIFICATION forming part of Letters Patent No. 503,986, dated August 29, 1893.

Application filed May 17, 1890. Serial No. 352,236. (No model.)

*To all whom it may concern:*

Be it known that I, GEORGE RICHMOND, residing in New York city, in the county and State of New York, have invented certain new and useful Improvements in Calculating and Recording Machines, of which the following is a specification.

This invention relates to machines for adding and performing other arithmetical calculations. Like nearly all previous calculating machines it is essentially an adding machine, other calculations being effected by variations of the process of addition.

In most adding or calculating machines as heretofore constructed the operation of addition has been performed by moving a handle, lever, or slide a variable distance according to the number to be added, as many such handles, levers, or slides being provided as there are digits in the highest number to be recorded. Thus to add the number 2476 it is necessary to move the unit lever or slide through six divisions, the tens lever through seven spaces, the hundreds lever through four spaces, and so on. My improved machine differs from those of this class in that a keyboard is provided similar to that of a typewriter, and the construction is such that in order to add a given number it is necessary only to press down in succession the keys marked with the digits comprising the number. Thus to add 2476 it is only necessary to press down in succession the keys marked "6," "7," "4" and "2." This manipulation sets the adding mechanism in operation, adding the number 2476 to the previous total, and furthermore the same number is printed in one or more places, preferably twice, once for example, on a card or bill, and once on a moving tape or record sheet.

By a development of my invention the machine is adapted to perform subtraction. This is generally done, as in all adding machines of which I am aware, by adding the arithmetical complement of the number to be subtracted; but, in my machine, the operator is relieved of the necessity of computing the arithmetical complement, since by the simple pressure of a subtraction key the machine is converted instantly into a device for adding, not the number which shall be determined by the successive keys depressed, but the arithmetical complement of that number. The machine thus adapted for subtraction is adapted for balancing ledger accounts, being so arranged that the debtor accounts are added and recorded on the left hand, and creditor accounts are subtracted and recorded on the right hand. The balance remaining, as shown by the totalizer, is removed therefrom by subtraction if it is a credit balance, and is printed on the right hand, or if it is a debit balance it is removed by addition and recorded on the left hand.

By a further development of my invention my machine is adapted for use as a difference engine, so that it will effect any computation which can be performed by the method of finite differences. By a process of reprinting of the totals presented at the totalizer the operator is enabled to carry any such computation to any limit within the total number of digits for which the machine is constructed.

My machine accomplishes by very simple mechanism results that have hitherto been attainable only by very complex and extremely costly apparatus. The mechanisms for obtaining these results may be briefly described as a recording and totalizing typewriter. A rotative shaft or arbor carries printing or type-wheels, preferably at its opposite ends, and is formed or provided with a cylinder having ten projecting teeth mounted angularly in successive tenths of a circle and distributed longitudinally in successively equal spaces. Ten keys are arranged each with a stop-projection formed for example by a projection on the key or a slot in the same adapted when pressed down to enter the circular path traversed by the corresponding one of the stop-teeth on the cylinder, so that when any key is depressed and the cylinder is rotated it will be stopped by the contact of its corresponding tooth with the stop on the key after having executed a fractional part of a revolution corresponding to the value represented by the key, and thereby bringing the corresponding numeral on one or both type-wheels into the printing position. Means is provided for rotating the cylinder forward upon the depression of any key, and for turning it backward when the key is released. A totalizer is provided having decimally numbered wheels to be advanced successively, commencing with the units, tens, hundreds, &c., each advance being in proportion to the extent of rotation imparted by the depression of any key to the stop-cylinder. To effect the successive connection of the stop-cylinder with the totalizer wheels the intervening parts are made movable after each printing operation relatively to the totalizer, this being done preferably by mounting the cylinder, keys, and type-wheels on a carriage which travels from right to left after each depression of a key. Means are provided for transposing the stop-cylinder relatively to the keys to bring a new set of teeth into action in order to cause the machine to add an arithmetical complement of a number to be subtracted, and thereby in effect to make the instrument a subtracting machine. Other accessories are also provided for enabling the instrument to effect different operations, as will be fully described hereinafter.

Having now given a general idea of the purposes, capacities and the principle of construction of my new calculating machine, I will proceed to describe it in detail with reference to the accompanying drawings, wherein—

Figure 2:
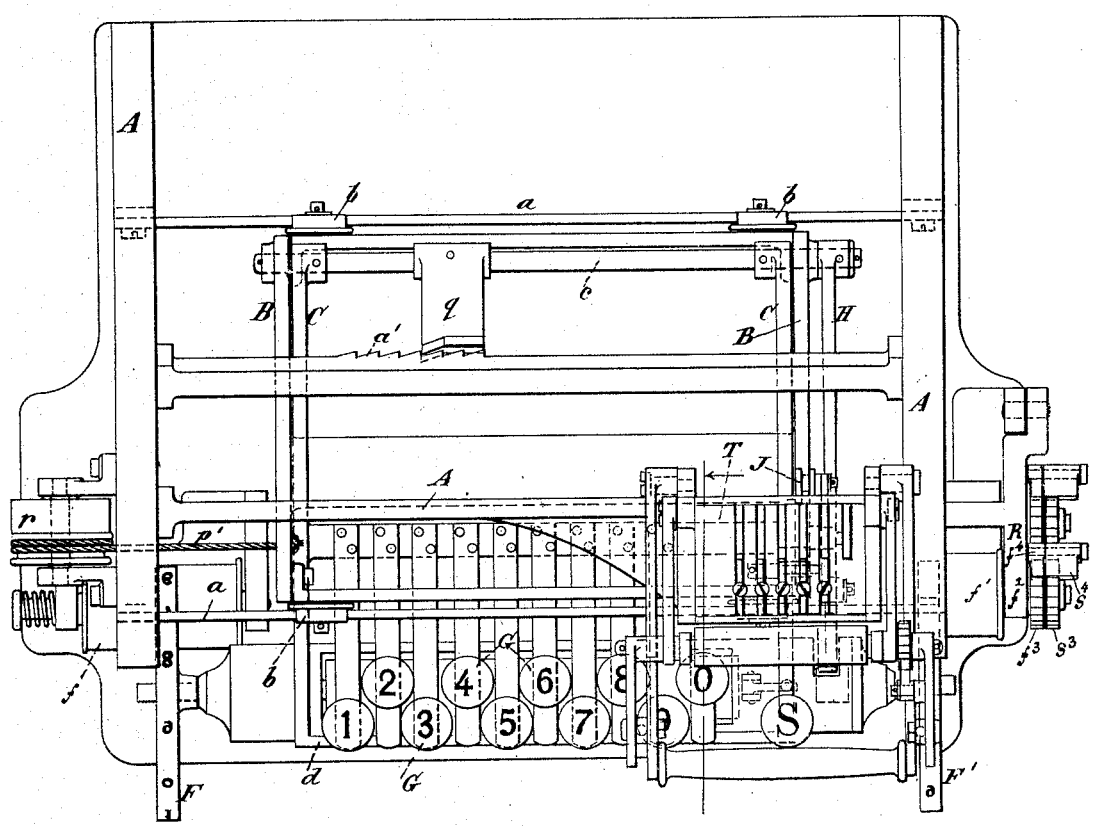
Figure 7:
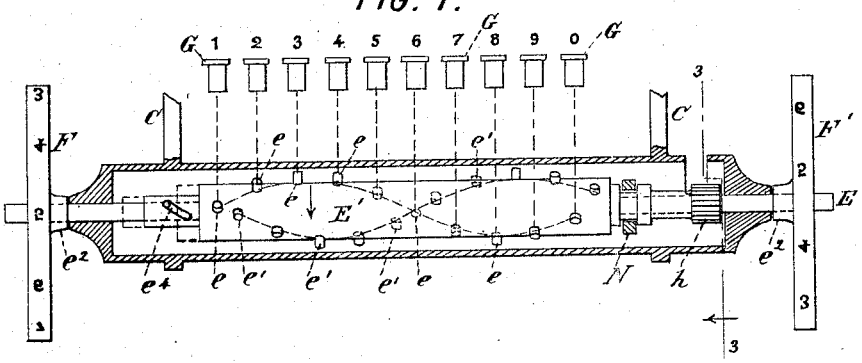
Figure 8:
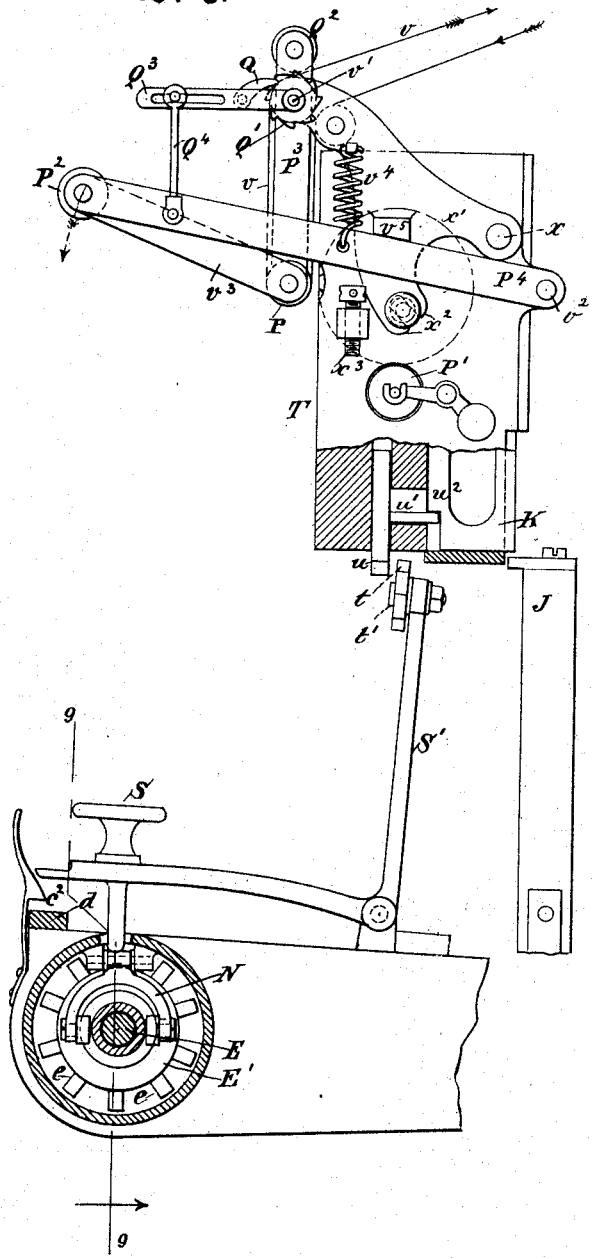
Figure 9:
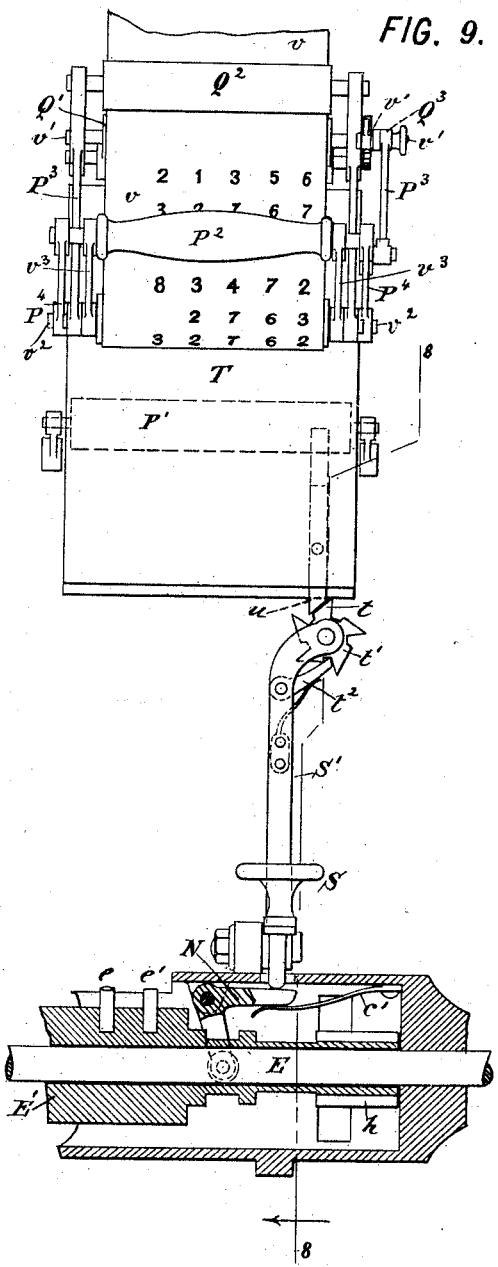
Figure 14:
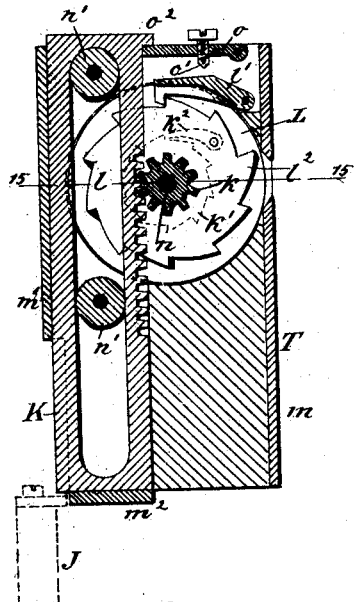
Figure 13:
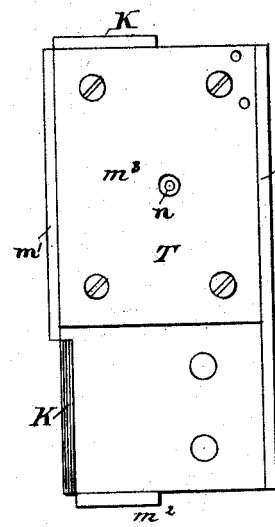
Figure 12:
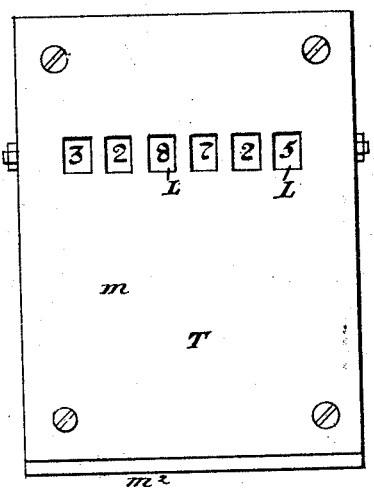
Figure 15:
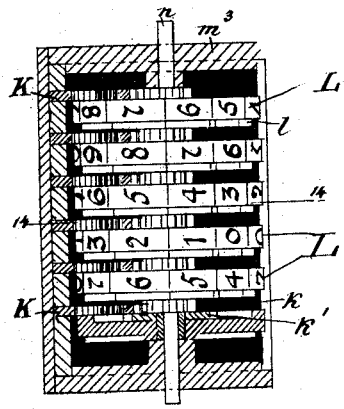
Figure 16:
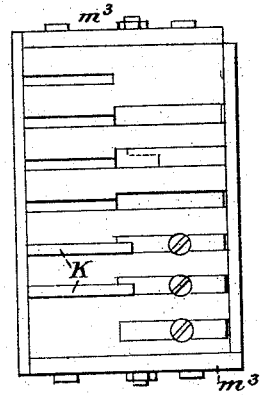
Figure 10:
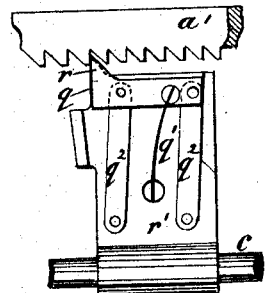
Figures 11, 23:
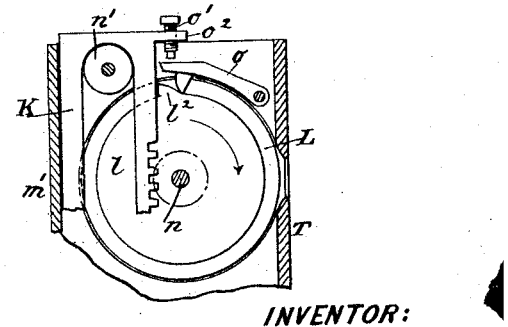
Figure 17:
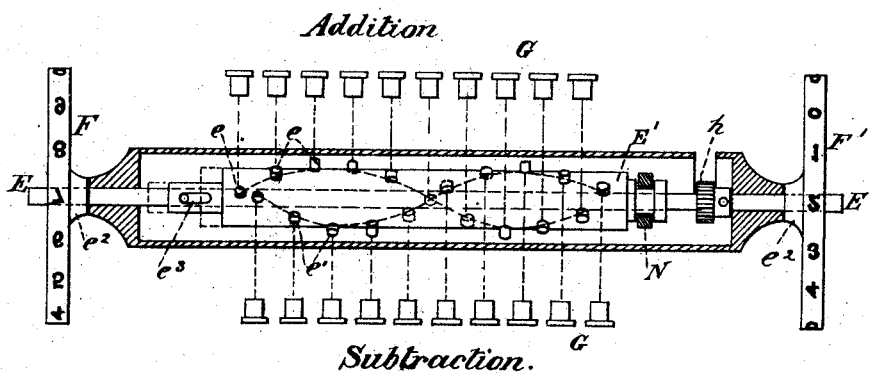
Figure 18:
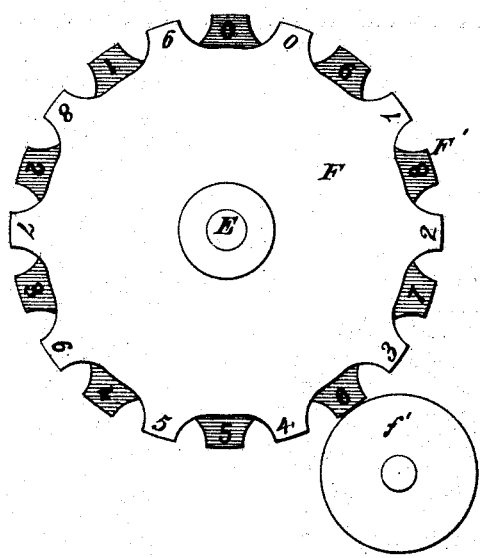
Figure 19:
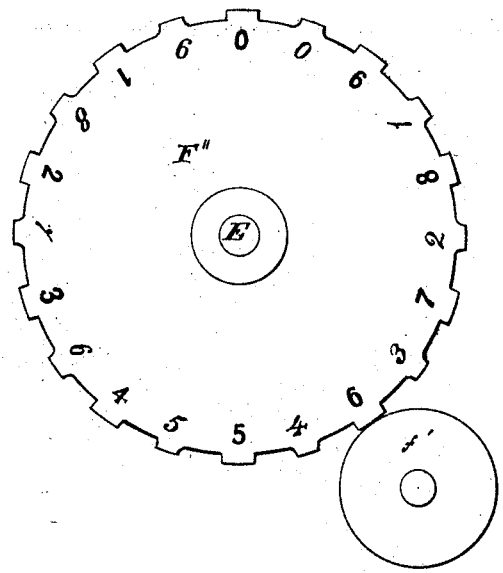
Figure 24:
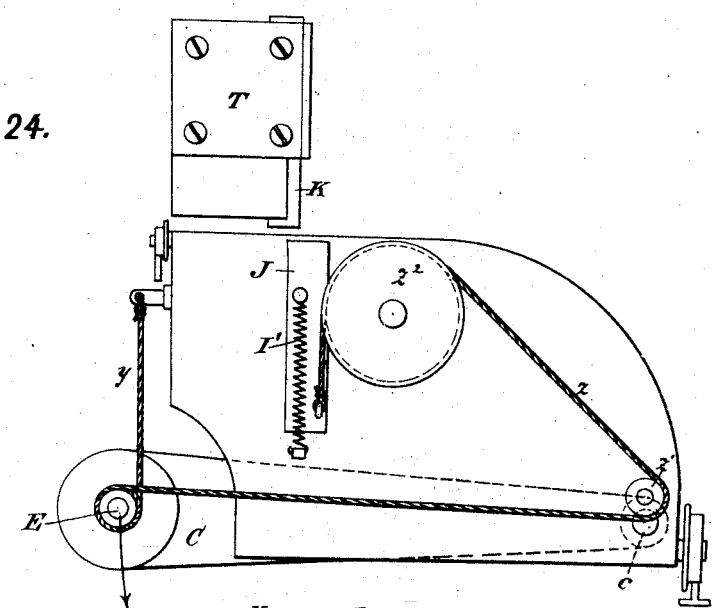
Figure 25:
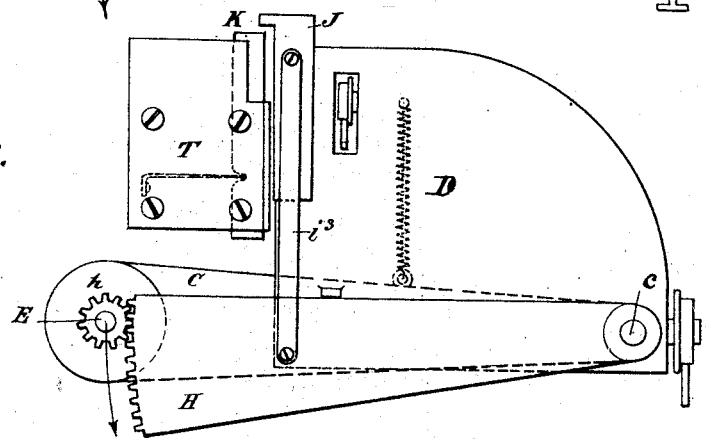
Figure 26:
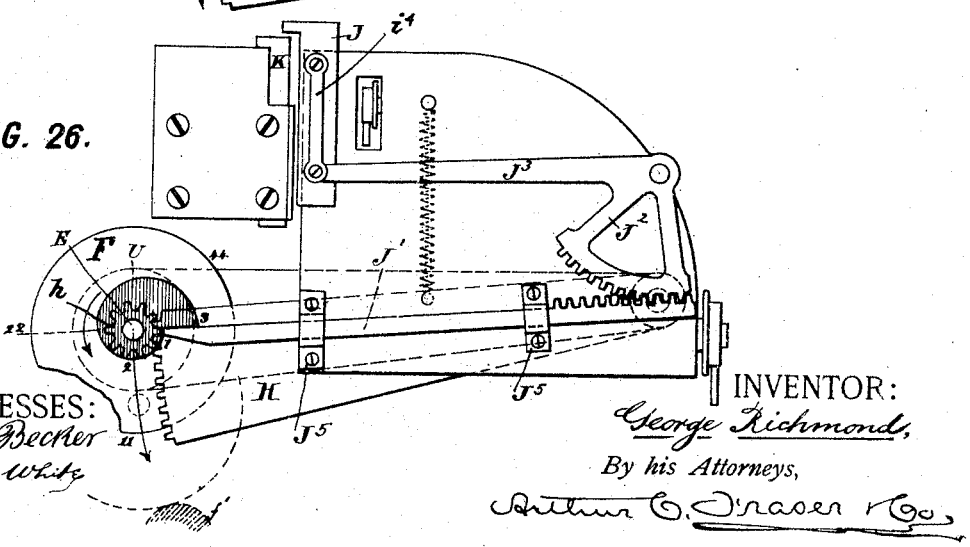

Figure 1 is a front elevation of my improved calculating machine in its most complete form to adapt it to perform all the operations hereinabove indicated. Fig. 2 is a plan view thereof. Fig. 3 is an end elevation thereof, the printing mechanism on the totalizer being omitted, as this is shown adequately from the same point of view in Fig. 8. Fig. $3^a$ is a fragmentary detail in section on the line $3^a$—$3^a$ in Fig. 3. Fig. 4 is a longitudinal mid-section of the paper-feeding roller, and Fig. 5 is an end elevation thereof. Fig. 6 is a vertical transverse section through the key-board and stop-cylinder. Fig. 7 is a horizontal section showing the stop-cylinder and type-wheels in plan and indicating diagrammatically the positions of the keys. Fig. 8 is a fragmentary side-elevation, partly in section on the line 8—8 in Fig. 9. Fig. 9 is a fragmentary front elevation, partly in vertical section on the line 9—9 in Fig. 8. Fig. 10 is a fragmentary front elevation, and Fig. 11 a side view in vertical transverse section, of the feed which controls the advance of the carriage from units to tens, tens to hundreds, &c. Fig. 12 is a front elevation of the totalizer detached. Fig. 13 is a side elevation thereof. Fig. 14 is a vertical transverse section thereof on the line 14—14 in Fig. 15. Fig. $14^a$ is a similar section of a modification. Fig. 15 is a horizontal section on the line 15—15 in Fig. 14. Fig. 16 is a plan thereof, certain "carrying-over levers" being removed. Fig. 17 is a diagrammatic view similar to Fig. 7, but illustrating a slightly different construction. Fig. 18 is an end elevation of two printing wheels, showing their relative arrangement. Fig. 19 is a similar view of a modified construction of the printing wheels. Fig. 20 is an inverted plan view, partly diagrammatic in character, illustrating the operation of the machine as a difference engine for calculating by the method of finite differences. Fig. $20^a$ shows the final form in which results are printed. Fig. 21 is an end view, and Fig. 22 a front view showing the feeding mechanism used for feeding the right-hand recording strip when the machine is used as a difference engine. Fig. $22^a$ is a fragmentary view of Fig. 1, showing the means of operating the mechanism of Fig. 22. Fig. 23 is an elevation of a printing wheel with perforating types. Figs. 24, 25, and 26 are side elevations corresponding to Fig. 3, but showing three different means for communicating motion from the stop-cylinder to the totalizer.

Let A designate the general frame of the machine, and B a carriage movable longitudinally thereon, being provided with wheels $b$ $b$ which travel on rails $a$ $a$ carried by the fixed frame. The carriage consists of any suitable framework supported from these wheels, within or by which is carried a movable frame C capable of moving up and down. This frame C might be mounted to move vertically, or nearly so, in a straight line, but is preferably mounted to move in an arc by being pivoted at $c$ on a rod or shaft, so that it swings from this center. It is normally drawn up by a spring or springs D attached to the carriage B.

In the upper or front portion of the frame C is mounted on oscillatory shaft or arbor E the opposite ends of which project and have type-wheels or printing wheels F F' fixed on them, as shown in Fig. 1. As the frame C is pressed down the arbor E is carried with it and the type-wheels are pressed against suitable printing surfaces beneath in order to impress one character for each wheel on a piece of paper or other material, as shown by the dotted position of the wheel F in Fig. 3 (the wheel F' being omitted in this figure for the sake of clearness). The impression may be made in the case of one wheel, as F, against a roller $f$ or any flat surface constituting part of, or fixed to, the frame A, and in the case of the other wheel, as F', against an impression or feeding roller $f'$.

The tilting frame C carries a series of ten keys, G G, numbered consecutively from 1 to 9 and 0, and also in my complete construction with an eleventh key marked "S," which I call the subtraction key. The ten keys G G consist of flexible or pivoted bars, preferably elastic plates fastened at one end to some part of the frame C, and carrying at their free ends a suitable button or knob, as best shown in Figs. 2 and 6. On the under side of each key is formed a projecting stop or tooth $q$. On the portion of the arbor E beneath the row of keys is mounted a cylinder E', which I call the "stop-cylinder." This cylinder may be fast on the shaft E or integral therewith if desired, but is preferably fastened thereto in such manner as to compel it to turn with the arbor, but to permit it to be moved longitudinally thereon for the purpose which will be explained hereinafter. This cylinder is formed with ten stop-teeth *e e* consisting preferably of pins driven or embedded into it and projecting slightly at their ends. These teeth are arranged at successive angular intervals of one-tenth of a revolution, and each tooth is arranged to revolve under one of the keys G and in position to encounter the stop-projection *g* thereof in case the key G is depressed. The stop-teeth are too short to be intercepted by the projections *g* except when the keys are depressed. The stop-teeth are so arranged that if the key marked "1" is pressed down and the arbor E is turned until stopped by the contact of its tooth with the key, it will turn one-tenth of a revolution and thereby present the figure 1 on one or other of its type-wheels in position to be printed. If the key 2 is pressed down and the arbor revolved it will stop after having turned two-tenths of a revolution, presenting the figure 2 to be printed, and so on with the other keys. If the zero key is pressed down the arbor will not revolve. It is obvious then that in order to cause any number to be printed it is only necessary to press down the corresponding key to provide for rotating the arbor until it is stopped in the position corresponding to that key, and then to press down the frame C until the type-wheel is brought against the printing surface. The elasticity of the keys is such relatively to the tension of the spring D that any key pressed down will move fully down and bring its stop-projection *g* into the path of the corresponding stop-tooth and the key itself will be seated on the ledge *d* of the tilting frame C before the spring D will yield and permit the frame C to be moved down bodily. Thus by pressing down any key the frame C is carried down with it to bring the type-wheel down far enough to print its character. The rotation of the arbor E is effected during, or as a consequence of, this depression of the frame. There are numerous ways of accomplishing this rotation of the arbor, the one shown in Fig. 3 being very simple and quite suitable for the purpose. On or near the end of the arbor E is mounted a pinion *h* meshing with sector-teeth formed on the outer end of a sector-arm or lever H which is pivoted preferably on the shaft *c*. This sector H is drawn up by a spring I until it encounters a stop at *j*. When the frame C is pressed down by the depression of any key the tension upon the sector caused by its spring I is sufficient to hold it stationary and cause the pinion *h* to roll along the sector rack after the manner of a planet wheel until the arbor E is stopped by the contact of one of its teeth *e* with the key. The arbor E becoming thus locked fast, the sector H is carried along with the arbor E during the remainder of the downward movement of the frame C. It is obvious that if the total downward movement of the frame C is equal in extent to that corresponding to an entire revolution of the arbor E, that is equal in value to the number 10, the arbor E will revolve as many tenths of a circle as is indicated by the number upon the key depressed, and the sector H will be carried down as many tenths of its extreme movement as the difference between this number and ten, or, in other words, its movement will be the arithmetical complement of that of the arbor E. Thus if the key 7 is depressed the arbor E will turn through seven spaces and the sector H will be depressed three spaces. I have described this arrangement because it is most easy of comprehension and because I may employ it in some embodiments of my invention, but in practice I prefer to reverse this order, causing the arbor E to turn as many spaces as the arithmetical complement of the number to be printed, and displacing the sector H as many spaces as the number to be printed. Each number on the type wheel must now be replaced by its arithmetical complement. Thus if the key 7 is depressed the arbor E will turn but three-tenths of a revolution and the sector H will be depressed seven-tenths of its total movement, and the type wheel will print not 3 (the amount of motion of its arbor) but 10—3, or 7, which is the number added by the motion of the sector rack. By thus making the movement of the sector H proportionate in extent to that of the number to be printed or added I am enabled to utilize the movement of the sector as the means for communicating motion to the totalizer. To this end I provide on the carriage a moving part or "communicator" constructed as an upright slide J, shown in its lowest position in Fig. 3. This slide I connect to the sector H in such manner that as the sector is pressed down the slide will move up to a proportionate extent. This connection is preferably made through a rock-lever *i* and links $i'$ $i^2$, as shown in Fig. 3. Hence upon the depression of any key the communicator slide J will move upwardly as many tenths of its total movement as the number of the key depressed. In so moving it will operate the totalizer T by its head coming underneath and lifting a vertically movable slide K thereof. To clearly understand the effect of this action upon the totalizer it will be necessary to explain the construction of the latter.

*Totalizer.*—This is best shown in Figs. 12 to 16. It consists essentially of a vertically-movable slide K, a register wheel L bearing numbers from 1 to 9 and 0, and an intervening ratchet and pawl, these parts being duplicated for the units, tens, hundreds, &c., up to as many digits as in the greatest number to be recorded. Each slide K is formed with rack-teeth meshing with a pinion *k* to which is fixed a ratchet-wheel $k'$, shown in dotted lines in Fig. 14 as being inside of the pinion toward the observer. The pawl $k^2$ of this ratchet is carried by the wheel L, the arrangement being such that as the slide K is lifted it rotates the wheel L corresponding to it in forward direction as many tenths of a revolution as the tenths of its total lift that it travels; and upon its release it falls back to place carrying the pinion $k$ and ratchet $k'$ freely with it. The backward rotation of the wheel L is prevented by a second ratchet $l$ fixed to it, preferably on its opposite face, as shown in Fig. 15, and which is engaged by a pawl $l'$. The several unitary totalizing mechanisms for recording units, tens, hundreds, &c., are assembled in a single case constructed preferably as a block of metal milled out vertically to form recesses in which the slides K K may slide, and bored out laterally to form recesses in which the wheels L L may turn. Plates $m$ $m'$ are applied against the front and back of the block, a plate $m^2$ against the bottom and plates $m^3$ against the ends, the latter plates being provided to cover the transverse bore in which the wheels L L work, and to form bearings for the axle-rod $n$ on which these wheels and their ratchets turn. The slides K K are guided anti-frictionally by rollers $n'$ engaging longitudinal slots in the slides and mounted loosely on rods extending transversely through the block. The front plate $m$ is formed with openings to expose one number on each wheel L, as shown in Fig. 12.

The totalizing operation may now be understood. To add the number 7854, for example, the units digit 4 is first added by pressing down the key "4." This causes the slide J to ascend through four spaces, pushing up the slide K of the units system in the totalizer four spaces, and carrying the corresponding totalizing wheel L forward four spaces; also by the act of depression the type wheel will print the number 4 having been arrested in suitable position to effect this by the action of the key marked 4. After having thus added and printed the units it is necessary for the carriage B to move one space to the left in order to bring the slide J under the tens totalizer slide K. This movement also is necessary to bring the type-wheels F F' in position to print the tens figure to the left of the units figure. This movement is effected by any suitable feed motion, such for example, as those commonly used on typewriters, and which serves to impart the movement to the carriage during the reascent of the frame C upon the release of the key. The carriage being now in the tens position the tens figure is added by depressing the key "5," which presses the slide J up five spaces and thus lifts the tens totalizer slide K up five spaces and advances the tens wheel five spaces. As the depressed key is released the carriage feeds another space to the left bringing it to the hundreds position, whereupon the key "8" is pressed down, thereby adding 8 to the hundreds wheel L of the totalizer. The carriage then moves another space to the left, bringing it to the thousands position, and upon depressing the key "7" the thousands wheel L is advanced seven spaces. The entire number, 7854, has thus been added as well as printed, and the operator then moves the carriage back to the right to bring it again to the units position ready to manipulate the keys for the next number to be added.

It is essential to a totalizer that some means shall be provided for "carrying over" from the units to the tens wheel, from the tens to the hundreds wheel, &c. That is to say, as each wheel in its advance movements passes from 9 to 0 the wheel of next higher value must be advanced one space. My means for doing this is best shown in Fig. 14. The ratchet-wheel $l$ has one tooth $l^2$ which projects farther than the others. This tooth passes under the pawl $l'$ at the instant that the wheel L is moving from 9 to 0, and in so doing lifts this pawl higher than it is ordinarily lifted and thereby causes it to strike a stop $o'$ on a lever $o$. This stop $o'$ is preferably an adjusting screw to facilitate the adjustment of the parts. The amount of lift thus transmitted from the pawl $l'$ to the lever $o$ is sufficient to cause the free end of the lever to ascend the distance of one-tenth of the total movement of the slide K. The free end of the lever $o$ projects under a shoulder $o^2$ on the slide K of next higher order, so that as the lever is thrown up this slide is elevated one space by the lever and is caused to propel its indicator wheel L one space. As the projecting tooth $l^2$ passes under the pawl $l'$ and the latter falls, the lever $o$ and slide K also fall, leaving the slide K down in its initial position in readiness to be lifted by the slide J an instant later when the device shall be operated for adding the next higher figure of the number. The carrying-over device thus constructed is very simple and cheap, easy of adjustment to compensate for wear, and not liable to get out of order. In this carrying-over device the tooth $l^2$ really performs a double function, being both one of the teeth of the ratchet-wheel $l$ and also in addition a cam for operating the lever $o$. It might be constructed entirely independent of the ratchet-wheel to perform only its function as a cam, as shown in Fig. 14ª, in which case also it might act directly on the lever $o$, as shown in that figure. This lever is here shown as taking the place of the pawl $l'$. The adjusting screw $o'$ is arranged in the projection or shoulder $o^2$ instead of being carried by lever $o$.

*Carriage-feed.*—Figs. 10 and 11 show a simple and suitable construction of feed for advancing the carriage B. This carriage is given a constant tendency to move toward the left by means of a spring in a barrel $p$, Fig. 1, acting through a cord or other flexible connector $p'$ after the manner common in type-writer carriages. It is normally restrained from moving by the engagement of a tooth $q$ carried by the carriage with one of the teeth of a rack $a'$ carried by the fixed frame $a$. The tooth $q$ is carried on the end of an arm $r'$ fixed on the shaft $c$, which shaft is fixed to the frame C so as to oscillate as the latter is depressed. This oscillation vibrates the arm $r'$ moving the tooth $q$ out of engagement with the rack $a'$ after first bringing into engagement therewith a tooth $r$ formed rigidly on the extremity of the arm $r'$. The tooth $q$ on passing clear of the rack-teeth, flies forward the distance of one tooth, impelled by a spring $q'$. Upon the release of the frame C, and the consequent backward movement of the arm $r'$, the tooth $q$ re-enters and the tooth $r$ escapes from the rack, so that by reason of the superior tension of the spring-barrel $p$ to the light spring $q'$ the carriage is moved to the left and forces back the tooth $q$ into position in line with the tooth $r$, as shown in Fig. 10. To give the tooth $q$ a parallel movement it is preferably mounted on parallel links $q^2$.

*Paper-feed.*—The means for advancing the impression rollers $f\,f'$ that feed the strips of paper will now be described. I will assume the case of the right-hand roller $f'$, the left-hand roller being operated in the same manner. Referring to Figs. 4 and 5, this roller is carried by bearing arms $f^2$ fastened to the frame A (Fig. 1), and consists of a tube or sleeve having a rod $s$ passing through its bore from end to end, and movable longitudinally therein, being pressed toward the left by a spring $s'$ and thrust toward the right by an adjustable thrust-piece $b'$ carried by the carriage B. As the carriage is moved toward the right after each adding operation to restore it to the units position this thrust-piece strikes the rod $s$ and forces it toward the right so that a pin $s^2$ which projects from it is moved in a right line through a slot $s^5$ in the sleeve $f'$, and by reason of the inclination of this slot (Fig. 4), and the fact that the rod $s$ is restrained from rotation in backward direction as hereinafter stated it (the rod $s$) turns the sleeve $s^6$ forward a distance equal to the space between two lines of the printed numbers on the tape passing over the roller $f'$. As the carriage moves again toward the left and the rod $s$ is released its spring $s'$ slides it toward the left and its pin $s^2$ travels in the slot $s^5$ so that the rod executes a helical forward and backward movement. The backward movement of the sleeve $s^6$ is prevented at this instant by the engagement of a ratchet-wheel $f^3$ with a pawl $f^4$, as shown in Fig. 5, while the backward rotation of the rod $s$ when thrust to the right is prevented by the engagement of a ratchet-wheel $s^3$ fixed on its end with another pawl $s^4$, as shown in Fig. 5. Thus the ratchet $s^3$ and sleeve $s^6$ execute alternate forward movements, the sleeve or impression roller $s^6$ moving forward after each complete number has been added and printed to feed the paper far enough for printing the next number beneath. The two type-wheels F F' may be formed with type arranged in like manner so as to print simultaneously the same figures, in which case the one will be used for printing the number representing amount of purchase on checks, tickets, or other pieces of paper which may be thrust into the machine to receive the impression of a single number, while the other wheel will be used to print the successive numbers added up by the machine on a tape or strip constituting a continuous record, and which may be wholly inclosed within the machine and inaccessible to its operator. When thus used the machine is adapted to perform the functions of so-called "cash registers" employed as a check upon cashiers, collectors or book-keepers receiving successively small sums in mercantile establishments and other business offices.

The device shown in Fig. 3$^a$ is a friction clasp or tension plate designed to engage the sector H when it is at rest with a frictional tension which shall be added to the resistance of the spring I in order to prevent the starting of the sector H in case one of the keys G is depressed too suddenly. This result might be effected by making the spring I very strong, but this is attended by the disadvantage that it will offer too much resistance to the depression of the frame to the printing position. The friction clasp consists of a loosely mounted plate M acted on by a spring M' and arranged when the sector H is in its highest position to press against it so that it is pinched between the plate M and the side of the carriage B. This frictional pinch is sufficient to so far resist the starting down of the sector H as to insure that the inertia of the arbor E and the parts which it carries shall be overcome, thereby preventing the moving down of the sector until the arbor E is positively stopped by the contact of one of the teeth $e$ with the depressed key.

*Subtraction*—My improved instrument, like any adding machine, may be used for performing subtraction by adding the arithmetical complement of the number to be subtracted. To make this clear I will assume that the existing total is eight thousand nine hundred and twenty-five, and that it is required to subtract two thousand four hundred and seventy-six therefrom. Assuming that the totalizer has six wheels the relative operations would be as follows:—

(1.) By subtraction:—
```
    008925
    002476
    ──────
    006449
```
(2.) By addition of the arithmetical complement:—
```
    008925
    997524
    ──────
   1006449
```
In this latter operation the 1 at the left passes off the machine, leaving only the difference, 6449, recorded.

To relieve the operator of the necessity of computing the arithmetical complement of the number to be subtracted (*i. e.*, mentally subtracting it from one million, or other multiple of ten beyond the capacity of the totalizer to record), I have constructed my machine so that it is only necessary for him to press down the subtraction key bearing the letter S (Fig. 2), and then to strike the numbered keys in the same manner as if he were adding the number to be subtracted. The instrument then of itself adds the arithmetical complement of the number instead of adding the number itself. It will be observed that every digit of the arithmetical complement above the units digit is the difference between the corresponding digit of the original number and nine. For example, $$9-1=8 \text{ (a. c. of 1)}$$
$$9-2=7 \text{ ( " " 2)}$$
$$9-3=6 \text{ ( " " 3), \&c.}$$

The units digit is the same plus one, since in the units it is the difference between the number substracted and ten instead of nine.

In order to make the instrument add the arithmetical complement it is necessary to so construct it that when the subtraction key S is depressed the subsequent depression of any of the other keys shall insure the stoppage of the cylinder E' after it has executed a movement equal to the difference between that of the number on the depressed key and nine-tenths of its revolution (ignoring for the present the necessity of adding one to the units). This will be made clear by comparing the following figures:—

$$0\ 1\ 2\ 3\ 4\ 5\ 6\ 7\ 8\ 9$$
$$9\ 8\ 7\ 6\ 5\ 4\ 3\ 2\ 1\ 0$$

The upper row of figures represents the numbers of the keys and the numbers which ordinarily will be printed and added, while the lower row represents the numbers which are actually added when the keys are depressed while the subtraction key is in action. To effect this result it is only necessary to provide the stop-cylinder E' with two sets of stop-teeth, of which the one set, $e\ e$ shall be arranged to extend around it helically in one direction, while the other set, $e'\ e'$, extends around helically in the other direction, as shown in Fig. 7, and to provide means for displacing the cylinder E' longitudinally sufficiently to move the teeth $e\ e$ out of line with the key stops $g\ g$ and bring the teeth $e'\ e'$ into line therewith. This relative movement is effected by the depression of the subtraction key S. With the cylinder E' thus provided the number resulting from the depression of the keys when the subtraction key is down will be one less than the arithmetical complement. It is then necessary in order to make the subtracting operation automatic that means shall be provided, to be brought into action only when the subtraction key is down, for causing one to be added to this number on the totalizer, thereby insuring the addition of the arithmetical complement.

Having thus explained the principle, I will now describe the means for carrying it out in order to effect subtraction. One suitable and simple construction for effecting subtraction is shown in detail in Figs. 8, 9, and 17. The subtraction key S is mounted on an elbow-lever pivoted at the rear and having an arm S' extending upwardly. The key S is normally pressed up by a spring $c'$ acting on the arm of the elbow-lever N on which the extremity of the lever S rests and when pressed down is caught by a spring-catch $c^2$ (see Fig. 8). The arbor E is formed with collars or shoulders $e^2$ $e^2$, Fig. 17, which prevent its longitudinal movement, but the stop-cylinder E' is mounted on the arbor in such manner that it may slide longitudinally thereon, being caused to turn therewith by means of a spline or a pin and slot $e^3$. It is normally pressed toward the right by the spring $c'$ which acting on the lever N, so that when the key S is not depressed its main stop-teeth $e\ e$ will stand in vertical planes intersecting those of the stops $g\ g$ on the keys, as shown in full lines in Fig. 17. When the key S is pressed down its movement is communicated through an elbow-lever N to thrust the cylinder E' toward the left, this movement being sufficient to bring the complemental stop-teeth $e'\ e'$ into the same vertical planes as the key-stops $g\ g$ (see dotted lines in Fig. 17). To prevent interference with the rotation of the cylinder E' the lever N is forked and carries anti-friction rollers which enter into a groove in the hub of the cylinder. The cylinder E' remains thus displaced so long as the key S remains held down by the catch $c^2$. When the subtracting operation is completed the operator will release the catch $c^2$, so that the spring $c'$ presses up the key S to its normal position and returns the cylinder E' to the right.

By omitting the thrust-collars $e^2$ and making the cylinder E' fast upon the arbor E the cylinder and arbor might slide longitudinally together, but this would be subject to the disadvantage that the printing wheels F F' would be displaced so as to print their records out of line with the preceding and succeeding impressions unless some special means were provided to enable the shaft to slide freely through these wheels. This suggested construction, however, might be employed in case of an adding and subtracting machine having no printing wheels F F'.

The means for adding 1 to the units wheel of the totalizer is shown in Figs. 8 and 9. The upper arm S' of the subtraction key-lever carries an inclined tooth $t$, preferably formed as one of the teeth of a ratchet-wheel $t'$ held by a pawl $t^2$. The totalizer T is provided with an auxiliary slide $u$, or other movable piece, arranged normally out of line with the incline $t$, but to be encountered thereby when the lever S' is tilted by the depression of the subtraction key. The parts are shown in Fig. 9 in position for printing units. The subtraction key being depressed and the machine operated, the arithmetical complement of the units figure of the number to be subtracted is communicated through the slide J to the units totalizer slide K, but as this number is one less than the true arithmetical complement it is then necessary to impart a further movement to the units slide K in order to add one to the number thus recorded. This is done by the feeding movement of the carriage B from the units to the tens position. In this movement the inclined tooth or cam surface $t$ in wedging past the inclined under face of the sliding bar $u$ lifts the latter a suitable distance, and the pin $u'$ projecting from this bar and taking under a shoulder $u^2$ on the slide K lifts this slide (which has already fallen back to place), the distance of one space, causing it to advance the units wheel L one unit. As the inclined surface or tooth $t$ passes beyond the bar $u$ the latter falls back to place and the slide K also falls. If the carriage be moved back to the right while the subtraction key is still depressed the ratchet-wheel $t$ encountering the lower end of the bar $u$ will be turned around one tooth, bringing a new tooth into place to constitute the inclined surface $t$ for acting upon and lifting the bar $u$ at the next ensuing subtracting operation.

*Printing added and subtracted numbers.*—In a machine for performing both addition and subtraction I prefer to construct the printing wheels F F so that one of them will print only the numbers added and the other only the numbers subtracted. In the description first herein given I have assumed that the two wheels F F' will both print alike, one printing on a card or ticket and the other printing a continuous record on a tape. If a machine so provided were employed for subtraction the type-wheels, instead of printing the numbers subtracted, would print each time a number one less than the arithmetical complement of the number subtracted. An expert could distinguish at a glance the arithmetical complements by a mental transposition after adding 1, and read them off as the correct numbers subtracted, but it is desirable to avoid the necessity for such computation. I therefore either construct one wheel to print only the numbers added and the other one only the numbers subtracted, or I construct one or both wheels to print both added and subtracted numbers, printing the actual numbers subtracted instead of their complements, and in order to distinguish at a glance the subtracted from the added numbers two different kinds of type may be used. According to the preferred development of my invention I construct the machine so that one wheel shall print only added numbers and the other wheel only subtracted numbers, the added numbers being preferably printed at the left and the subtracted numbers at the right. The machine thus constructed I call a "balancing machine" because of its adaptability for balancing ledger accounts and for other analogous computations.

*Balancing accounts.*—Assuming the construction to be such that the left-hand wheel prints only added and the right-hand wheel only subtracted numbers (this result being accomplished by means which I will presently describe), the machine may be used for balancing accounts by printing the debtor amounts as added numbers and printing the creditor amounts as subtracted numbers. The operator has only to bear in mind that in printing a debtor item the subtraction key must be up and in printing a creditor item the subtraction key must be down. When all the items of one account have thus been printed the balance will be shown by the totalizer. If the balance is on the creditor side the number of the balance will be shown at the totalizer, but if it is on the debtor side the totalizer will show the arithmetical complement of the number, which may be readily recognized as such. It is then only necessary in either case in order to print the balance for the operator to print the arithmetical complement of whatever number is visible at the totalizer, thus reducing the wheels of the totalizer to 0. This is done in the case of a creditor balance by pressing down the subtraction key and printing the number displayed, but in the case of a debtor balance (the arithmetical complement of which appears at the totalizer) the operator has to raise the subtraction key and print the proper numbers to turn the successive indicator wheels to 0, whereby the proper debtor balance is written on the left hand. The preferred method for effecting this result of causing one wheel to print only added numbers and the other only subtracted numbers is shown best in Figs. 7 and 18. The stop-cylinder E' is mounted on the arbor E so as to slide longitudinally thereon while the arbor is restrained from longitudinal movement as in Fig. 17, but the rotative connection between the cylinder and arbor instead of being a straight spline or slot and pin $e^3$, as in that figure, is a helical spline or slot and pin $e^4$, as shown in Fig. 7. The cylinder is restrained from rotative movement while being shifted longitudinally by having the pinion $h$ which gears with the sector H formed integrally with it instead of this pinion being fastened to the arbor. Consequently when, by the movement of the subtraction key S, the cylinder E' is shifted longitudinally the arbor E is caused to execute a slight rotative movement forward or backward, this movement being preferably to the extent of one-twentieth of a revolution. As the type-wheels F and F' are fixed to the arbor they participate in this movement. Each wheel is constructed with a space or notch between its printing types of such depth that when the wheel is brought against the impression roller $f$ or $f'$ the types on the opposite sides of this space, if the wheel has been rotated to bring this space into register with the roller, will not come against the roller and consequently no printing will be effected. By turning the wheels so that the printing types of one are intermediate of those of the other, that is that the types of one coincide with the spaces or notches of the other, as shown in Fig. 18, one wheel will always print when the other does not. The characters on the two wheels are arranged in inverse order, as shown in Fig. 18, those on the wheel F being adapted to print the added numbers and those on the wheel F' being adapted to print the subtracted numbers, that is those on the keys depressed when the subtraction key is down.

Instead of staggering the two wheels F F' the rollers $f f'$ might be placed one at an angle one-twentieth of a revolution in advance of the other.

Other mechanical means may be substituted for the one shown for effecting the advance and retraction of the type-wheels to the extent of one-twentieth of a revolution upon the depression or release of the subtraction key. The simple means shown, however, I consider the best for the purpose of any that are known to me.

*Difference engine.*—In order to render my calculating machine adaptable for use as a difference engine for effecting computations by the method of finite differences, it is only essential to provide it with means for printing the successive totals or balances appearing at the totalizer. To this end the totalizer wheels L L (or any other wheels geared to them), are made type-wheels with any suitable device for inking the types, and with means for pressing a roller or other impression surface carrying the paper or tape against these type-wheels to print a record of any balance that the totalizer indicates. One simple and convenient means for effecting this printing of the totals is that shown best in Figs. 8 and 9. The totalizer wheels L L are formed as type-wheels, and directly in front of the openings in the totalizer frame or block through which the numbers on these wheels are visible (Fig. 12), is placed an impression roller P over which is carried a tape $v$ of paper. The type-wheels are inked by a roller P' extending through a hole in the block of the totalizer T, and the surface of which is charged with aniline or other ink. The impression roller P is pressed against the totalizer type-wheels in order to take the impression by pressing down a handle P$^2$ conveniently arranged in front of it. In the construction shown the roller P is hung from an axial spindle $v'$ by lever-arms P$^3$, the handle P$^2$ being connected by lever-arms P$^4$ to an axial pivot $v^2$ and communicating movement to the roller P by toggle links $v^3$. As the handle is pressed down the arms P$^4$ are brought into line with the links $v^3$, thereby pressing the roller P backward against the type-wheels. On the release of the handle it is drawn up by springs $v^4$ engaging the arms P$^4$ until the latter are stopped by abutment with a projection $v^5$. The upward movement of the handle feeds the paper strip $v$ forward far enough to make room for the next impression. This feeding is effected by a ratchet and pawl Q, the ratchet carrying a roller Q' over which the strip passes and against which it is pressed by a roller Q$^2$, and the pawl being mounted on and moved by an arm Q$^3$ which is rocked from one of the arms P$^4$ through the medium of a link Q$^4$. The arm Q$^3$ is slotted so that the leverage at which Q$^4$ acts may be adjusted in such a manner as to insure the pawl taking one or more teeth as may be required for feeding the paper. The paper strip as it is printed passes under the roller P and up on the other side thereof, ascending thence to the roller Q', so that the successive numbers printed thereon are plainly visible (Fig. 9), to the operator for a sufficient time to enable him to copy them in performing the subsequent operations of computation.

When the machine is used for purposes in which it is not desired to print the totals the printing mechanism just described is thrown out of action by swinging it over upwardly and backwardly around a center $x$ to which is pivoted the base-plate or frame $x'$ on which all the parts except the pivot $v^2$ are mounted. To effect this the plate $x'$ is loosened, by releasing a thumb-screw $x^2$ which engages it and clamps it to the frame of the totalizer T. The screw $x^3$ is an adjustable stop to limit the downward movement of the arms P$^4$ in printing, and thereby to regulate the force of the impression.

*Finite difference computations.*—It is essential to an understanding of the use of my machine as a difference engine that the method for effecting computations by finite differences shall be clearly understood. This method is best illustrated by a simple example. Let it be required to continue the series of numbers of which each term is the cube of the number of terms, and which commences as follows:—

|   | 1, | 8, | 27, | 64, | 125, &c. |
|---|---|---|---|---|---|
| $\triangle'$ |  | 7 | 19 | 37 | 61 |
| $\triangle''$ |  |  | 12 | 18 | 24 |
| $\triangle'''$ |  |  | 6 | 6 |  |
| $\triangle^{iv}$ |  |  | 0 |  |  |

In the example above given there are three orders of differences (the fourth disappearing). The next term of the series (216) is obtained by adding the final previous differences in the ascending order, namely, $6+24+61+125=216$. This process if conducted on the machine and each total printed would give on the totalizer record tape $v$ the following successive numbers:—

6
30
91
216 the last figures constituting the sixth term, and if this series were then copied again and added to the last number the new addition would give the seventh term (343). The new series of differences thus produced would give the eighth term and prepare the series of differences for the ninth term, and so on indefinitely. The complete operation necessary then to produce a term of the series consists in adding the four known numbers and then effacing the record to reduce the totalizer to zero by performing the subtraction of the last term. The last term thus subtracted is printed by the right hand or subtraction wheel.

The operation may be best understood by referring to the diagram Fig. 20, where the three printing tapes are shown in connection with the machine. The machine is here shown diagrammatically in inverted position for convenience of illustration, the printing wheels F F' being transposed to retain the addition wheel F at the left and the subtraction wheel F' at the right. The numbers successively written to be added together are printed on the left-hand tape $v'$, the corresponding totals of each adding operation are printed on the middle or totalizer tape $v$, and the numbers finally printed while the substraction key is down are printed on the right-hand tape $v''$. By comparing these tapes it will be seen that when each final number or term of the series is obtained on the totalizer it is taken off by subtraction, thereby printing it on the right-hand tape and simultaneously effacing the totalizer record by bringing the latter back to a row of zeros (the zeros which fill out to the left of the full number on the totalizer are omitted from the diagram for the sake of clearness). Thus in order to continue any series of numbers which can be calculated by the method of finite differences it is only necessary to furnish the operator with the first complete set of differences and instruct him to copy them by type-writing, and when he has done so to copy in the same manner the new set of differences which the machine will have prepared for him on the totalizer tape, and to keep on copying each time the set last prepared by the machine, the result at the end of each series being taken off by subtraction. By placing a screen in front of the ascending portion of the tape $v$ in Fig. 8 with a slit exposing only one number at a time the instructions can be simplified by telling the operator to simply copy each row of figures as it appears at the slit until the final figure of the series appears, and then to subtract it. My machine accomplishes thus by very simple mechanism what has hitherto been effected only by extremely complicated and expensive machines. It is true that it is not automatic, and that an error in copying will introduce an error in the results, but this can occur only through gross carelessness, and is readily detected by a comparison of the addition tape with the totalizer tape. As each series of numbers on the addition tape is the same as the preceding numbers on the totalizer tape a verification of the accuracy of each new result may be had by comparing these two series of numbers before proceeding to print the next following series. If the difference series contains negative differences these will be written as the arithmetical complements of the negative numbers, and all negative numbers will appear on the totalizer as arithmetical complements. Should the final result be a negative number the fact that it appears as an arithmetical complement indicates that it is not to be effaced by subtraction, but by addition. The subtraction key is therefore raised and the number is taken off by adding enough to each digit to produce 0. The number so added is the arithmetical complement of that which appears at the totalizer. As this number is the final result it should appear on the right-hand tape in Fig. 20, notwithstanding that it is a negative result. But with the machine constructed as hereinabove described it would be printed on the left-hand tape along with the successively added numbers.

To insure that the final term or result of each computation shall be printed on the right-hand tape, and to enable positive and negative quantities to be instantly distinguished, I provide the machine with a special type-wheel to be substituted for the type-wheel F' when the machine is being used for difference calculations. This special type-wheel F'' is shown in Fig. 19. It has the same characters as the subtraction type-wheel F', and in addition thereto it has in the intervening spaces the same characters as the addition type-wheel F, but these latter characters are in a different type, so that the impression printed from them will be understood to be a negative quantity. Thus the types printing positive quantities may be heavy faced, and those printing negative quantities may be light faced or hair-line characters. The relative arrangement of the digits of the two sets will be complemental, after the manner indicated in Fig. 19. A similarly constructed wheel may be substituted also for the addition wheel F if desired, so that in adding negative quantities the correct numbers (instead of their arithmetical complements), may be printed at the left by first depressing the subtraction key. The use of these duplex printing wheels would necessarily result in the printing of a character by each wheel at each depression of a key, so that the right-hand tape, instead of receiving impressions only of the final results of each computation, would be confused by receiving impressions of the intervening operations by which these results are attained. To avoid this I provide means for restraining the printing of impressions from the right-hand wheel except at the intervals when the final results are to be printed. This mechanism is shown in Figs. 1 and 2, and more clearly in Figs. 21 and 22. The impression roller $f'$ over which the right-hand tape passes is mounted in a swinging frame R, which is normally dropped too low to bring the impression roller against the printing wheel F' except at certain intervals (as, in the example given, at every fifth impression), at which time it is automatically elevated to print the impression and then again dropped. Various mechanical devices may be provided for giving these successively rising and falling movements to the frame R. The means that I have adopted for this purpose consist of a cam R' constructed to be turned by a ratchet device one space at each return movement of the carriage to the units position, and having cam arms acting against a projection $w$ on the frame R to lift it at the proper time. The means for turning the cam R' step by step is the same as that already described with reference to Figs. 4 and 5 for turning the roller $f'$, except that it is located lower down and operated by a special push-piece $b^2$ below the push-piece $b'$ Fig. 22$^a$ which operates the rod $s$ of the roller $f'$. Both push pieces are mounted on a projection or bracket $z$, forming part of or attached to the traveling table. Hence this movement need not be again described with reference to its employment for actuating the cam R'.

As it is desirable to avoid the blank spaces between the successive final numbers or results of the computations as they are printed on the right-hand tape in order to bring these numbers compactly together, as shown in Fig. 20$^a$, the step by step feeding of the roller $f'$ is interrupted during the time that the roller is dropped below the printing position, this feeding being effected only at every fifth impression (or other interval) whenever the roller is raised to the printing position. This result follows of itself from the construction shown, since it is only when the roller is raised that its rod $s$ comes in line with the push-piece $b'$ which operates it, it being at other times dropped so low that the push-piece passes clear over it. Hence the printed ribbon will appear as in Fig. 20$^a$, the numbers being printed in close order and ready for reproduction by photo-engraving or other process.

Any or all of the printing wheels may be constructed to perforate the characters instead of printing them, in order thereby to produce a stencil from which copies may be made by the process of forcing ink through the perforations of the stencil onto a surface of paper laid beneath it. Fig. 23 shows a type-wheel thus constructed for perforating.

I prefer to construct my calculating machine with all the parts and accessories herein described in order to adapt it to be used for any of the purposes hereinabove recited. If, however, the machine is required to perform only certain operations those parts or accessories which are useful only when it is performing other operations may be omitted from it, thereby utilizing my invention in part.

Many of the mechanical constructions forming parts of my machine may be varied in detail or substituted by other equivalent constructions without thereby departing from my invention. Thus for example, the mechanical movements by which I accomplish certain results, such as the production of the step by step progression of the paper feed rollers, may be modified by substituting for them any other known mechanical movements employed for producing the same effects.

As examples of certain modifications that may be made I have illustrated in Figs. 24, 25, and 26 three different constructions for communicating rotative movement to the arbor E and its stop-cylinder E', and to the slides of the totalizer, in place of the construction shown in Fig. 3.

In Fig. 24 the arbor E is shown as rotated through the medium of cords, chains, or other flexible connectors in lieu of the pinion and sector-rack before described. As the tilting frame C is pressed down the cord $y$ fastened to the carriage above unwinds from the arbor, thus revolving the latter forward until it is stopped by the key depressed. The forward rotation of the arbor winds upon it a cord $z$ which extends back to a point intersecting the axis of the pivotal rod $c$, passing thence around a sheave $z'$, up over a sheave $z^2$ and down to where it connects with the slide J. The winding of this cord onto the arbor thus pulls it and lifts the slide a proportionate distance. The extent of movement of the slide is hence directly as the forward movement of the arbor instead of being complemental thereto, but this difference only requires that the totalizer wheels shall have their numerals applied in correspondingly inverted order. By reason of the cord passing through the axis of the rod $c$ it is not affected by the swing of the frame C, but only by the rotation of the arbor E. When the frame C is released the arbor is caused to rotate backward under the tension of a spring I' which pulls downwardly on the slide J and hence exerts a tension through the cord $z$. Thus the arbor E rotates backwardly as it ascends and rewinds around it the cord $y$.

Fig. 25 shows a construction for communicating direct instead of complemental movements to the totalizer slides while still retaining the use of the pinion $h$ and sector-rack H, which are mechanically preferable to the cords in the figure last described. The totalizer T is here inverted, its slides K K being acted on from the top and pressed downwardly by it instead of being pushed upwardly as before. They must of course be provided with springs to restore them instead of being restored as in the first construction by their own weight. The slide J is connected with the sector H directly through a link $i^3$. The slide J' for transmitting motion from the cam slides in bearings J$^5$ screwed on to the side of the traveling frame.

In Fig. 26 the arbor is turned by a pinion $h$ and sector-rack H, as in the construction last described, the only difference being in the means here provided for operating the slide J. On the arbor E is fixed a snail cam U, the portion of which from 1 to 2 is concentric, and the portion from 2 around to the apex 3 is a spiral of uniform pitch. This cam acts against a sliding rod J' having rack-teeth gearing with a toothed sector J² from which projects an arm J³ which is connected by a link $i^4$ to the slide J. The first quarter revolution of the shaft E while the concentric portion of the snail is working against the rod J' produces no effect upon the slide J, but after the point 2 is passed the snail begins to push back the rod and hence draw down the slide J. The portion of the type-wheel F from the point 11 around to 22 corresponding to the portion of the snail from 1 to 2 is devoid of numeral types, but may be utilized for letters or other marks that it is desired to print without affecting the adding mechanism. The remaining three-quarters of the circumference of the wheel, from 22 around by 44 to 11, is provided with numeral types from 0 to 9. The displacement of the slide J through the cam is proportional to the extent of rotation of the type-wheel beyond 22, and between 22 and its extreme movement. By resorting to this construction the machine may be made to print before, after, or between any figures, any desired marks, characters, or symbols such as those used in mathematical computations.

I have adopted a traveling carriage carrying the type-wheels, arbor, stops, keys, and the communicator and moving relatively to the impression rollers or surfaces and the totalizer, as being the most convenient construction. It is not essential, however, that all these parts should travel. In an adding machine it is only essential that the communicator shall move relatively to the totalizer from units to tens, hundreds, &c. The communicator might be actually stationary and the totalizer might move. In a printing or recording adding machine the type-wheels must also move after each impression relatively to the printing surfaces, but the wheels might remain stationary and the printing surfaces be made to move. In either case a relative movement is all that is essential. Obviously also the subtraction key and its accessories constitute simply a shifting device for bringing the keys into co-active relation with the complemental stops instead of the direct stops. This is most conveniently done by shifting the stop-bearing cylinder, but it might be done by shifting the key-board.

Those features which are really essential to my invention will appear from the definitions thereof contained in the several claims following this specification.

I claim as my invention the following-defined novel features or improvements, substantially as hereinbefore specified, namely:

1. The combination with a totalizer having independent indicator wheels for units, tens, &c., of a communicator or thrust-piece movable toward the totalizer and adapted to advance either wheel thereof proportionally to the extent of its movement, a series of stop-keys for determining the extent of its movement, whereby when any key is depressed a totalizer wheel is advanced as many figures as correspond to the value of the depressed key, and a feed for transferring the action of the communicator from one totalizer wheel to the next after each movement, whereby the successive thrust-movements of the communicator are transmitted successively to the respective totalizer wheels.

2. The combination with a totalizer having independent indicator wheels for units, tens, &c., of a communicator or thrust-piece movable toward the totalizer and adapted to advance either wheel thereof proportionally to the extent of its movement, a series of stop-keys for determining the extent of its movement, whereby when any key is depressed a totalizer wheel is advanced as many figures as correspond to the value of the depressed key, said communicator being movable to bring it into operative connection with the several totalizer wheels successively, and a feeding mechanism actuated by the depression of the keys and connected to the communicator to move it each time from the position to operate one totalizer wheel to that for operating the next.

3. The combination with a totalizer having independent indicator wheels for units, tens, &c., of a communicator or thrust-piece movable toward the totalizer and adapted to advance either wheel thereof proportionally to the extent of its movement, a rotatable arbor connected to said communicator to impart motion thereto, a series of stop-keys adapted to arrest the arbor after it has executed angular movements corresponding to the values of the respective keys, and means for rotating the arbor upon the depression of any key, whereby the extent of movement of the arbor and communicator, and the consequent advance of the totalizer, are determined by the particular key depressed, and a feed for transferring the action of the communicator from one totalizer wheel to the next after each movement.

4. The combination with the totalizer, of a communicator or thrust-piece adapted to advance the totalizer proportionally to the extent of its movement, a series of stop-keys for determining the extent of its movement, a rotatable arbor carrying stop-teeth at different angular positions, adapted to be engaged by the respective keys when depressed, means for rotating the arbor upon the depression of any key until stopped after it has executed the angular movement corresponding to the value of said key, and a mechanical connection between the arbor and communicator, whereby the extent of movement of the latter is determined by that of the former.

5. The combination with a totalizer having independent indicator wheels for units, tens, &c., of a communicator or thrust-piece movable toward the totalizer to advance either wheel thereof proportionally to the extent of its movement, a carriage carrying said communicator and movable step by step to bring the communicator into operative connection with the several totalizer wheels successively, a series of stop-keys for determining the extent of the thrust movement of the communicator, and a feed for advancing the carriage actuated by the depression of the keys and adapted to move the carriage after the thrust movement of the communicator.

6. A totalizer consisting of indicating or printing wheels L L, slides K K, one to each wheel, a mechanical connection between each slide and its wheel in the nature of a rack-and-pinion and ratchet-and-pawl devices, whereby the slide when displaced advances the wheel and when released is freely retracted, and a carrying-over device consisting of a cam-tooth $l^2$ carried by each wheel except the one of highest value, a lever $o$ arranged to be displaced by said cam-tooth while the wheel is passing from 9 to 0, and a shoulder $o^2$ on the slide of the wheel of next higher value arranged to be encountered by said lever on the displacement thereof, whereby the displacement of the lever moves the slide and advances the next wheel one unit.

7. The combination with a totalizer having independent indicator wheels for units, tens, &c., and slides connected to said wheels respectively for advancing them when the slides are displaced, of means for displacing the slides consisting of a communicator or thrust-piece movable toward and in line with the movement of the slides, a series of stop-keys for determining the extent of the movement of said communicator, whereby when any key is depressed its communicator is thrust against a totalizer slide for a distance corresponding to the value of the depressed key, and a feed for intermittingly advancing the communicator relatively to the totalizer from a position in line with one slide to a position in line with the next after each thrust movement.

8. The combination with a totalizer, of a communicator for imparting advance movements thereto and means for determining the extent of the advance movements consisting of a rotatable arbor, a series of stop-projections thereon arranged in different angular positions, a series of keys marked with numbers or values, and having each a stop arranged when the key is depressed to enter the path of the corresponding stop-projection and arrest the arbor when it has executed an angular movement corresponding to the value represented by the key depressed, means for imparting a forward rotation to the arbor upon the depression of any key, and a mechanical connection between the arbor and communicator, whereby the extent of projection of the latter is determined by the extent of rotation of the former.

9. The combination of a printing wheel, an arbor connected to said wheel to impart rotation thereto carrying a series of stop-teeth arranged in different angular positions corresponding to the successive values to be printed by the respective types of said wheel, a series of keys marked with numbers or values corresponding to those of said wheel, and having each a stop arranged when the key is depressed to enter the path of the corresponding stop-tooth on the arbor and arrest the latter when it has executed an angular movement corresponding to the value represented by the key depressed, whereby the corresponding character on the wheel is brought to the printing position, means for imparting a forward rotation to the arbor upon the depression of any key, an impression roller or surface carrying the material to be printed on, and a feeding mechanism actuated by the depression of the keys and adapted to move the printing wheel relatively to the printing surface after each impression, whereby the successive digits of a number may be printed from the same wheel by successive impressions.

10. The combination of an intermittingly movable carriage, an arbor carried thereby having angularly-arranged stop-teeth connected thereto, a series of stop keys adapted when depressed to engage said teeth and arrest the arbor, a printing wheel connected to the arbor, and a feed mechanism for advancing the carriage after each impression in order to enable successive digits of the same number to be printed in proper positions by the same wheel.

11. The combination of a printing wheel, an arbor connected to said wheel and adapted to impart motion thereto, a series of stop-teeth in connection with said arbor, arranged in different angular positions, a series of stop-keys adapted each when depressed to encounter one of said stop-teeth and arrest the arbor with the corresponding type on the printing wheel in position to be printed, a movable frame carrying said arbor by the depression of which the printing wheel may be moved against an impression surface, and means for rotating the arbor upon the depression of any key.

12. The combination of a printing wheel, an arbor connected to said wheel and adapted to impart motion thereto, a series of stop-teeth in connection with said arbor, arranged in different angular positions, a series of stop-keys adapted each when depressed to encounter one of said stop-teeth and arrest the arbor with the corresponding type on the printing wheel in position to be printed, a movable frame carrying said arbor by the depression of which the printing wheel may be moved against an impression surface, and means for rotating the arbor upon the depression of said frame consisting of a pinion on the arbor and a toothed rack or sector meshing therewith, and a spring or tension device acting on said rack to hold it stationary and thereby effect the rotation of the arbor until the arrest of the latter, whereby during the subsequent movement of the frame said rack is carried down bodily with it against the tension of said spring.

13. The combination with a traveling carriage, of a swinging frame carried thereby, a spring tending to elevate said frame, a sector-lever also carried by the carriage, a spring for drawing it up, a rotative arbor carried by said frame and having a pinion meshing with said sector, a series of angularly-arranged stop-teeth in connection with said arbor and a series of stop-keys each adapted when depressed to intercept one of said stop-projections and arrest the rotation of the arbor after it has executed an angular movement corresponding to the value of the depressed key.

14. The combination of a movable frame, an arbor carried thereby, stop-keys for rotating it, a pinion on said arbor, a sector-lever meshing with said pinion, a spring for resisting the displacement of said sector-lever by the pinion, and a spring clasp constructed to frictionally engage the sector-lever when it is elevated and thereby to reinforce the tension of the spring in resisting its depression while overcoming the inertia of the arbor.

15. The combination with a totalizer, of a communicator or thrust-piece consisting of a slide J, a rotatable arbor, stop-keys for arresting said arbor, a pinion on said arbor, a rack or sector meshing with said pinion and having a retractile device, and a connection between said rack or sector and said communicator adapted to project the latter proportionally to the displacement of the former, whereby the movement imparted to the communicator is the complement of the rotative movement of the arbor.

16. The combination of a rotatable arbor having angularly-arranged stop-projections, printing wheels at the opposite ends of said arbor to be rotated thereby, stop-keys for determining the extent of rotation of the arbor, a movable frame in which the arbor is mounted and which when pressed down by the depression of any key moves down the printing wheels to print the impression, means for rotating the arbor upon the depression of the frame, impression rollers or surfaces for holding the material to be printed on, and a feed mechanism for displacing the printing wheels relatively to the impression surfaces after each impression to enable each wheel to print successively the digits of a number, whereby the wheels simultaneously print like or corresponding numbers on the two impression surfaces.

17. The combination of a carriage, a rotatable arbor carried thereby having angularly-arranged stop-projections, stop-keys for determining the extent of rotation of said arbor, a printing wheel carried by said arbor, an impression roller for holding the material to be printed on, a feed mechanism for moving the carriage after each impression, and a paper-feed consisting of a push-piece carried by the carriage and a plunger arranged to be displaced thereby upon the movement of the carriage after printing a number, and ratchet mechanism intervening between said plunger and impression roller for advancing the impression roller upon each displacement of said plunger.

18. The combination with an adding machine comprising co-acting stops and keys for determining the totalizing movements proportionally to the values to be added, of means for effecting subtraction consisting of a series of complemental stops, and a device for relatively displacing the stops and keys to bring the complemental stops into operative relation with the keys, whereby upon operating the keys to represent the number to be subtracted the machine is caused to add the arithmetical complement of such number.

19. The combination with an adding machine comprising a totalizer, a communicator for actuating the totalizer proportionally to the extent of its movement, stop-keys, and a series of stops for determining the movement of the communicator proportionally to the values to be added, of means for effecting subtraction consisting of a series of complemental stops, and a device for relatively displacing the stops and keys to bring the complemental stops into operative relation with the keys, whereby upon operating the keys to represent the number to be subtracted the machine is caused to add the arithmetical complement of such number.

20. The combination with an adding machine having a rotatable arbor with co-acting stops and keys for determining the extent of angular movement of said arbor, of means for effecting subtraction consisting of a series of complemental stops and a device for relatively displacing the stops and keys to bring the complemental stops into operative relation with the keys, whereby upon operating the keys to represent the number to be subtracted the machine is caused to add the arithmetical complement of such number.

21. The combination with an adding machine having stop-keys, and direct and complemental stops to be alternatively engaged thereby, of a subtraction key to control the relative arrangement of the stops and keys, adapted when in one position to bring the direct stops into operative relation with the keys, and when in the other position to bring the complemental stops into relation therewith, whereby in the former position the machine performs addition and in the latter position it performs subtraction by adding the arithmetical complement.

22. An adding machine having stops and stop-keys, combined with a subtraction key, and complemental stops to be brought into operative relation with the stop-keys upon the displacement of the subtraction key, and with means connected to said subtraction key and adapted to act during its displacement for adding 1 to the units digit in order to correct the total during the operation of subtraction.

23. An adding machine comprising a totalizer, a communicator for actuating the totalizer proportionally to the extent of its movement, and co-acting stops and keys for determining the movement of the communicator proportionally to the values to be added, combined with means for effecting subtraction consisting of a series of complemental stops, a subtraction key for relatively displacing the stops to bring the complemental stops into operative relation with the keys, and an adding device connected to the subtraction key to be displaced thereby to act upon the totalizer and add 1 to the units digit thereof at each subtracting operation.

24. An adding machine comprising a totalizer, a communicator and co-acting stops and keys for determining the movements of the communicator, and a feeding mechanism for moving the communicator relatively to the totalizer from units to tens, hundreds, &c., after each adding operation, combined with means for effecting subtraction consisting of complemental stops, a subtraction key for relatively displacing the stops, and means for adding 1 to the totalizer consisting of an inclined tooth $t$ connected to and displaced by the subtraction key, and arranged relatively to the totalizer so that when displaced it shall enter the path of an operative part of the units system thereof, and upon the feeding movement from the units to the tens position it will displace such part and add 1 to the units digit.

25. The combination of a series of stop-keys, an arbor, two series of stops in connection with said arbor to be alternatively engaged by said keys, two printing wheels connected to and deriving motion from said arbor for printing respectively characters corresponding to the respective series of stops, and a shifting device in connection with the stops and wheels, adapted when in one position to bring one series of stops into operative relation with the keys, and to cause one wheel to print, and when in the other position to bring the other series of stops into operative relation with the keys and cause the other wheel to print.

26. The combination of a series of stop-keys, an arbor having stops for determining its angular movement, two printing wheels connected to and deriving motion from said arbor, said wheels formed with equidistant types and intervening spaces, the impression rollers or surfaces against which said wheels print, the wheels being staggered relatively to said surfaces, so that when a type on either wheel is in position to print the other wheel will present a blank space to its impression surface, and a shifting device adapted when moved to displace said arbor and wheels an angular distance intermediate of that between the types, whereby its movement turns the inoperative wheel into position to print, and renders the other wheel inoperative.

27. The combination of a series of stop-keys, an arbor, two series of stops in connection with said arbor to be alternatively engaged by said keys, two printing wheels connected to and deriving motion from said arbor for printing respectively characters corresponding to the respective series of stops, said wheels formed with spaces between their printing types, the impression rollers or surfaces against which said wheels print, the wheels and surfaces being relatively arranged so that when a type on either wheel is in position to print the other wheel will present a blank space to its impression surface, whereby only one wheel can print at a time, and a shifting device in connection with the stops and wheels, adapted when moved from one position to another to bring the inoperative series of stops into relation with the keys, and to rotate the arbor and type-wheels sufficiently to move the inoperative wheel into position to print.

28. A combined adding or subtracting and printing machine consisting of a totalizer, two printing wheels adapted to print alternatively, one for added and the other for subtracted numbers, co-acting direct and complemental stops and keys for determining the angular movement of said wheels and the advancement of the totalizer, and a shifting device or subtraction key adapted when in one position to cause the numbers impressed on the keys to be added to the totalizer and printed by the addition wheel, and when in the other position to cause the numbers to be subtracted and printed by the subtraction wheel, whereby the machine is adapted for use in balancing accounts, and analogous operations.

29. The combination of an arbor, a stop-cylinder thereon, a series of stop-keys co-acting with the stops on said cylinder, a printing wheel or wheels connected to and deriving motion from said arbor, a shifting device for displacing said cylinder longitudinally relatively to said arbor, and a helical connection between the cylinder and arbor, whereby the lateral displacement of the cylinder communicates angular movement to the wheel or wheels, to bring a series of types thereon into or out of angular positions to be printed.

30. An adding machine comprising a totalizer, a series of keys for determining the numbers to be added thereon, a shifting device by the operation of which the numbers determined by the keys are subtracted therefrom, combined with a printing mechanism for taking impressions of the successive totals and differences on the totalizer, and a means for printing successively each subtracted number.

31. An adding machine comprising a totalizer, an addition printing wheel, a subtraction printing wheel, a series of keys for determining the number to be printed, and a shifting device or subtraction key for determining the addition or subtraction of the numbers, combined with a printing mechanism for taking impressions of the successive numbers indicated by the totalizer, whereby by repeatedly adding successive series of totals according to the method of finite differences, and effacing them by subtraction, the subtraction wheel prints the resulting terms.

32. An adding machine comprising a totalizer, an addition printing wheel having intervening characters for printing subtracted numbers, a subtraction printing-wheel having intervening characters for printing added numbers, a series of keys for determining the numbers to be printed, and a shifting device or subtraction key for determining the addition or subtraction of the numbers, adapted to angularly displace the printing wheels in shifting from addition to subtraction, or vice versa, whereby during addition both wheels will print the number added (or its complement) and during subtraction both will print the subtracted number, combined with a printing mechanism for printing the successive totals indicated at the totalizer, whereby the machine may be used for computations by the method of finite differences involving either positive or negative values.

33. The combination with an adding machine comprising a totalizer, of printing mechanism for printing the successive totals, consisting of an impression roller P mounted adjacent to the totalizer type-wheels, links $P^3$ $P^3$ supporting said roller, an operating handle $P^2$ and toggle-links $P^4$ and $v^3$ adapted on the depression of said handle to press the impression roller against the type-wheels, and a feeding mechanism adapted to advance the strip of paper after each impression.

34. An adding machine comprising a totalizer, a printing wheel, a series of keys for determining the numbers to be printed, an impression roller for carrying the paper to be printed on, movable up and down, feeding mechanism for advancing the strip of paper after each impression, and mechanism for elevating or depressing the impression roller, adapted to hold it depressed beyond the reach of the printing wheel during a predetermined number of successive printing operations, and subsequently to lift it into position to receive an impression, whereby the printing of undesirable or intermediate numbers upon the paper may be avoided.

35. In an adding machine, a movable carriage, a printing wheel carried thereby and an impression roller for carrying the paper to be printed, combined with a feeding mechanism for advancing the paper after each impression consisting of a thrust-piece $b'$ carried by the carriage, a rod $s$ arranged to be displaced thereby, a sleeve $f'$ carrying the impression roller and connected to the rod through the medium of a spiral slot and pin connection, ratchet-wheels and pawls for preventing the backward rotation of the rod and sleeve respectively, and a retracting spring for restoring the rod after displacement.

In witness whereof I have hereunto signed my name in the presence of two subscribing witnesses.

GEORGE RICHMOND.

Witnesses:
ARTHUR C. FRASER,
JNO. E. GAVIN.